United States Patent
Shu et al.

(10) Patent No.: US 11,692,829 B2
(45) Date of Patent: Jul. 4, 2023

(54) SYSTEM AND METHOD FOR DETERMINING A TRAJECTORY OF A SUBJECT USING MOTION DATA

(71) Applicant: BEIJING DIDI INFINITY TECHNOLOGY AND DEVELOPMENT CO., LTD., Beijing (CN)

(72) Inventors: Weihuan Shu, Beijing (CN); Hailiang Xu, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 588 days.

(21) Appl. No.: 16/731,860

(22) Filed: Dec. 31, 2019

(65) Prior Publication Data
US 2020/0132465 A1    Apr. 30, 2020

Related U.S. Application Data

(63) Continuation of application No. PCT/CN2017/109361, filed on Nov. 3, 2017.

(51) Int. Cl.
*G01C 21/16* (2006.01)
*G06T 7/20* (2017.01)

(52) U.S. Cl.
CPC ............ *G01C 21/1654* (2020.08); *G06T 7/20* (2013.01); *G06T 2207/20081* (2013.01); *G06T 2207/30196* (2013.01); *G06T 2207/30241* (2013.01)

(58) Field of Classification Search
CPC ............... G01C 21/165; G06T 7/20; G06T 2207/20081; G06T 2207/30196; G06T 2207/30241
See application file for complete search history.

(56) References Cited

U.S. PATENT DOCUMENTS

| 8,374,775 | B2* | 2/2013 | van der Merwe ..... G01C 21/12 |
| | | | 702/179 |
| 2007/0005246 | A1 | 1/2007 | Kappi |
| 2009/0312867 | A1 | 12/2009 | Hasegawa et al. |

(Continued)

FOREIGN PATENT DOCUMENTS

| CN | 104061934 A | 9/2014 |
| CN | 104754111 A | 7/2015 |

(Continued)

OTHER PUBLICATIONS

Alzantot, Moustafa, "UPTIME: Ubiquitous Pedestrian Tracking using Mobile Phones", 2012, IEEE Wireless Communications and Networking Conference, pp. 3204-3209 (Year: 2012).*

(Continued)

*Primary Examiner* — Terrell M Robinson
(74) *Attorney, Agent, or Firm* — Finnegan, Henderson, Farabow, Garrett & Dunner, LLP

(57) ABSTRACT

Embodiments of the disclosure provide a system and method for determining a trajectory of a subject. The method can include acquiring motion data of the subject to which the mobile device is attached; determining a motion status of the subject based on the motion data; and determining the trajectory based on the motion data using a trajectory model corresponding to the motion status.

16 Claims, 5 Drawing Sheets

(56) References Cited

U.S. PATENT DOCUMENTS

| | | | | |
|---|---|---|---|---|
| 2012/0303319 | A1* | 11/2012 | Kirkeby | G01C 22/006 |
| | | | | 702/160 |
| 2014/0032124 | A1* | 1/2014 | Umer | A61B 5/1116 |
| | | | | 702/19 |
| 2014/0129189 | A1 | 5/2014 | Gyorfi | |
| 2015/0004998 | A1* | 1/2015 | Pennanen | H04W 64/00 |
| | | | | 455/456.1 |
| 2015/0149085 | A1* | 5/2015 | Bakshi | G01C 21/16 |
| | | | | 701/500 |
| 2015/0316383 | A1 | 11/2015 | Donikian | |
| 2016/0153777 | A1 | 6/2016 | Ni et al. | |
| 2016/0171017 | A1 | 6/2016 | Li et al. | |
| 2017/0241787 | A1 | 8/2017 | Trigoni et al. | |

FOREIGN PATENT DOCUMENTS

| | | | |
|---|---|---|---|
| CN | 105009027 | A | 10/2015 |
| CN | 106408124 | A | 2/2017 |
| CN | 105606102 | B | 4/2017 |
| CN | 106679657 | A | 5/2017 |
| CN | 106705967 | A | 5/2017 |
| CN | 106908060 | A | 6/2017 |
| CN | 107105404 | A | 8/2017 |
| CN | 107246672 | A | 10/2017 |
| CN | 107250727 | A | 10/2017 |

OTHER PUBLICATIONS

International Search Report in PCT/CN2017/109361 dated Jun. 14, 2018, 4 pages.
Written Opinion in PCT/CN2017/109361 dated Jun. 14, 2018, 3 pages.
Chinese Office Action dated Aug. 31, 2022, in counterpart Chinese Application No. 201780055874.9.

* cited by examiner

SYSTEM AND METHOD FOR DETERMINING A TRAJECTORY OF A SUBJECT USING MOTION DATA

CROSS-REFERENCE TO RELATED APPLICATIONS

This application is a continuation of International Application No. PCT/CN2017/109361, filed on Nov. 3, 2017, the entire contents of which are incorporated herein by reference.

TECHNICAL FIELD

The present disclosure relates to determining a trajectory of a subject, and more particularly, to systems and methods for determining a trajectory of a subject using a mobile device attached thereon using Pedestrian Dead Reckoning.

BACKGROUND

As navigation function becomes more common in mobile phone and Location-Based Service (LBS) grows rapidly, it demands more accurate and more reliable pedestrian navigation and positioning technology. However, as a primary positioning means in pedestrian navigation, Global Positioning System (GPS) receiver is not adapted to position under complex urban canyons and indoor environments due to signal attenuation, interference and blockage, etc. In order to obtain continuous navigation, Pedestrian Dead Reckoning (PDR) have been used. PDR data can be acquired by a variety of sensors in a mobile device (e.g., a mobile phone, a tablet, a smart watch, or the like). The trajectory of the user can then be determined based on the PDR data using a PDR model.

However, a user may have different movement gestures (e.g., jogging, walking, climbing, or the like), and each of the movement gestures can generate a set of distinct data for the PDR model. Thus, determining trajectories for the different movement gestures may require different PDR models. Furthermore, when the mobile device are placed on different parts of the user, it may generate totally different PDR data, causing even more difficulties for determining the trajectories of the movement of the user.

Embodiments of the disclosure provide improved systems and methods for determining a trajectory of a subject to address one or more of the above problems.

SUMMARY

Embodiments of the disclosure provide a computer-implemented method for determining a trajectory of a subject. The method may include acquiring, via at least one sensor of a mobile device, motion data of the subject to which the mobile device is attached. The method may further include determining, by a processor, a motion status of the subject based on the motion data. The method may also include determining, by the processor, the trajectory based on the motion data using a trajectory model corresponding to the motion status.

Embodiments of the disclosure further provide a system for determining a trajectory of a subject. The system ay include a communication interface configured to communicate with a mobile device attached to the subject, acquiring motion data of the subject. The system may further include a memory configured to store at least one trajectory model. The system may also include a processor configured to determine a motion status of the subject based on the motion data, and determine the trajectory based on the motion data using a trajectory model corresponding to the motion status.

Embodiments of the disclosure further provide a non-transitory computer-readable medium that stores a set of instructions, when executed by at least one processor of a device, cause the device to perform a method for generating a trajectory of a subject. The method may include acquiring motion data of the subject to which the mobile device is attached. The method may further include determining a motion status of the subject based on the motion data. The method may also include determining the trajectory based on the motion data using a trajectory model corresponding to the motion status.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
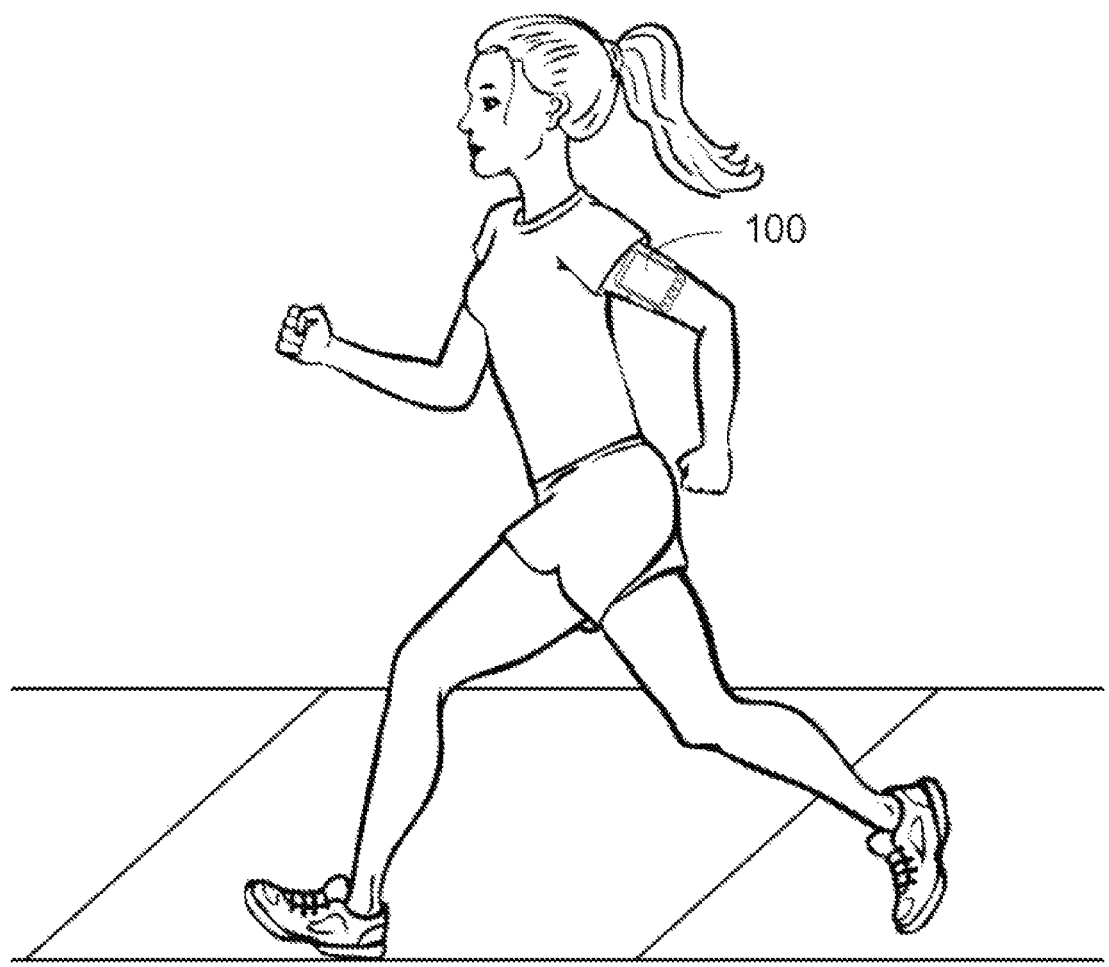
FIG. 1 illustrates an exemplary diagram of a user jogging with a mobile device attached thereon, according to embodiments of the disclosure.

FIG. 1 illustrates an exemplary diagram of a user jogging with a mobile device 100 attached thereon, according to embodiments of the disclosure.

As shown in FIG. 1, for example, the user may be jogging on a street with mobile device 100 attached on her arm. When mobile device 100 is attached to the user, the user can be positioned by positioning mobile device 100.

Along with the movement of the arm, mobile device 100 can collect data for determining a trajectory of the user. The data can be collected by at least one sensor of mobile device 100. The at least one sensor can include at least one of a GPS module, an accelerometer, a gyroscope, an electronic compass, a barometer, or the like. A GPS module may communicate with positioning satellites, and collect GPS signals indicating the position of mobile device 100, and thus in turn, the positions of the user can be determined based on the collected GPS signals. An accelerometer can measure acceleration of a subject, or even small vibrations. For example, the accelerometer can respectively detect accelerations along three axes of a coordinate with the subject centered at the origin. An electronic compass can measure the magnetism of the earth. For example, the electronic compass can measure the direction, strength, or the relative change of a magnetic field, so as to determine the direction of the subject via mobile device 100. A barometer can measure barometric pressure, which can assist mobile device 100 to determine whether the subject carrying mobile device 100 enters an indoor environment from an outdoor environment, or vice versa. In some embodiments, the acceleration, the direction, the orientation, the barometric pressure, or the like can be referred to as motion data.

The process for determining the trajectory of the user can include a training stage and a determination stage. In the training stage, the GPS signals and the motion data can be used for training a trajectory model. The trajectory model can be generated based on the GPS signals and the motion data by, for example, a Pedestrian Dead Reckoning (PDR) method using machine learning techniques, so that the trajectory model can "predict" the trajectory given enough motion data in the determination stage. The motion data in the training stage can also be referred to as training data, and the GPS signals can be used to generate reference movements to be used in the training stage. In the determination stage, the GPS signals are typically not use, and the motion data can be used for determining the trajectory using the trained trajectory model.

It is contemplated that, when a mobile device is "attached" to the user, the user can wear the mobile device (e.g., a smart glass on the head), hold the mobile device in the hands (e.g., a mobile phone), or place the mobile device in a pocket or a handbag. The way how the mobile device can be "attached" is not limited to the above examples, as long as the movement of the mobile device can be associated with the movement of the subject (e.g., the user). For example, mobile device 100 can alternatively be attached to any other part of the user, such as leg, waist, wrist, and head, etc. Mobile device 100 can also be attached indirectly to a user via any other subject that is attached the user, such as a purse, belt, and clothing, etc.

Figure 2:
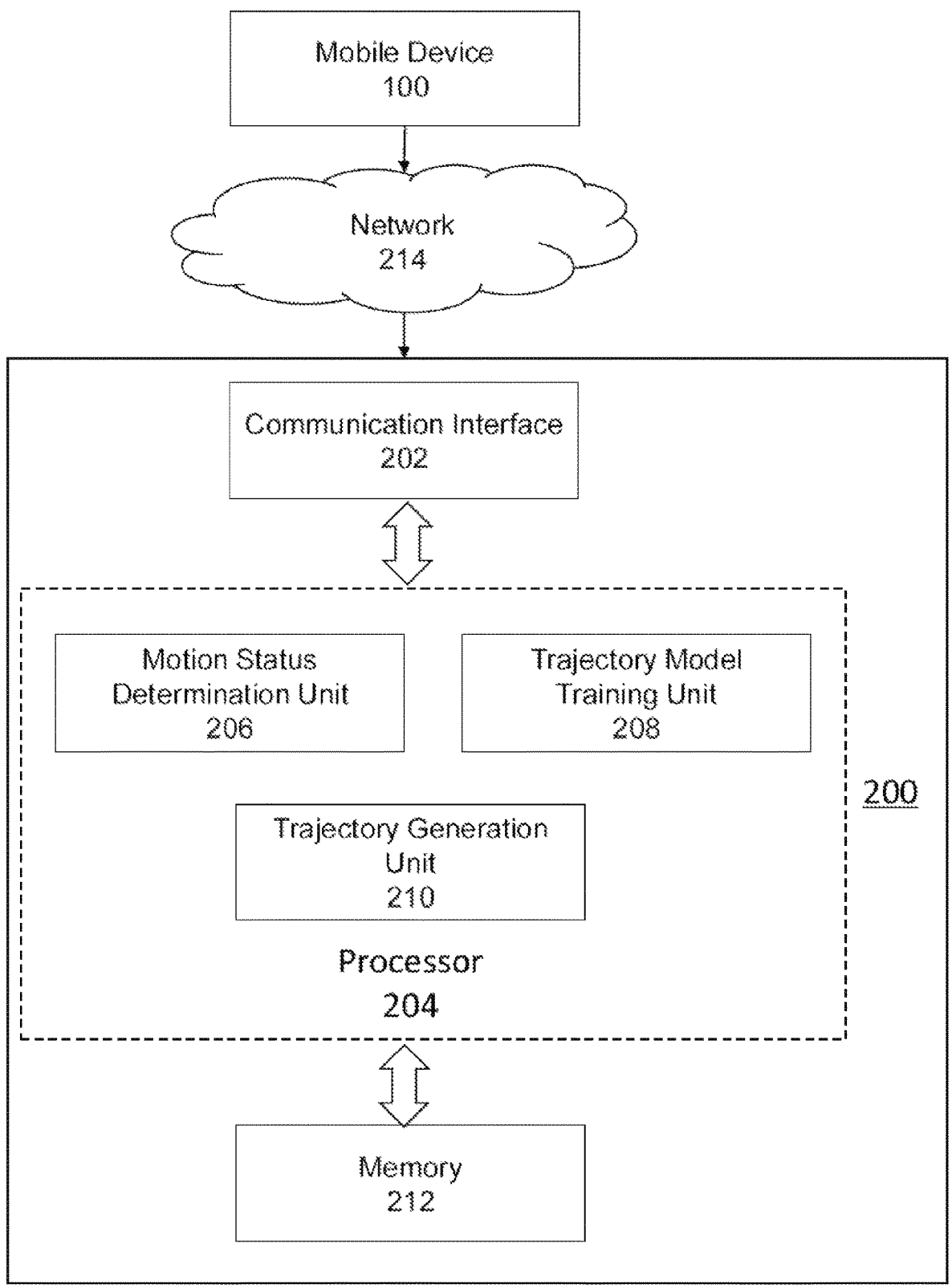
FIG. 2 illustrates a schematic diagram of an exemplary trajectory generation system, according to embodiments of the disclosure.

The PDR data collected by mobile device 100 can be further processed by a trajectory generation system 200, which will be further described with reference to FIG. 2. FIG. 2 illustrates a schematic diagram of an exemplary trajectory generation system 200, according to embodiments of the disclosure. It is contemplated that, trajectory generation system 200 can be a separate system (e.g., a server) or an integrated component of mobile device 100. Because training a trajectory model may require significant computation resources, in some embodiments, trajectory generation system 200 may be preferably implemented as a separate system as illustrated in FIG. 2. In some embodiments, trajectory generation system 200 may include sub-systems, some of which may be remote, and the rest may reside on mobile device 100.

Trajectory generation system 200 can be a general server or a proprietary device for generating a trajectory of a user. In some embodiments, as shown in FIG. 2, trajectory generation system 200 may include a communication interface 202, a processor 204, and a memory 212. Processor 204 may further include multiple functional modules, such as a motion status determination unit 206, a trajectory model training unit 208, a trajectory generation unit 210, and the like. These modules (and any corresponding sub-modules or sub-units) can be functional hardware units (e.g., portions of an integrated circuit) of processor 204 designed for use with other components or a part of a program. The program may be stored on a compute readable medium, and when executed by processor 204, it may perform one or more functions. Although FIG. 2 shows units 206-210 all within one processor 204, it is contemplated that these units may be distributed among multiple processors located near or remotely with each other. In some embodiments, trajectory generation system 200 may be implemented in the cloud, or on a separate computer/server.

Communication interface 202 may be configured to acquire motion data of the subject (e.g., the user) to which mobile device 100 is attached. In some embodiments, when trajectory generation system 200 is configured to train trajectory models, communication interface 202 can be further configured to acquire from mobile device 100 the GPS signals for determining the accurate positions of mobile device 100. Communication interface 202 can be an integrated service digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In any such implementation, communication interface 202 can send and receive electrical, electromagnetic or optical signals that carry digital data streams representing various types of information via network 214. Network 214 can include a cellular communication network, a Wireless Local Area Network (WLAN), a Wide Area Network (WAN), or the like.

Motion status determination unit 206 may be configured to determine a motion status of the subject based on the motion data. The motion status can include a movement gesture of the subject or a place on the subject where mobile device 100 is attached. As discussed above, the motion data can include the acceleration, the direction, the orientation, the barometric pressure, or the like. Based on the above motion data, motion status determination unit 206 can determine at least one of a stride length, a stride frequency, and a direction of movement for the subject. For example, the stride frequency can be determined based on the accelerations along three orthogonal axes, the direction of the movement can be determined based on the direction and the orientation provided by the gyroscope and the electronic compass, and the stride length can be determined based on a movement distance and the stride frequency. Based on the motion data, the place on the subject where mobile device 100 is attached can also be determined similarly based on the motion data. For example, mobile device 100 can be determined to be attached to an arm (as shown in FIG. 1), worn on a wrist, placed in a pocket or a handbag, or the like.

The movement gesture and the place on the subject where mobile device 100 is attached can be critical for determining the trajectory of the subject. For example, the motion data for various movement gestures (e.g., walking, jogging, and climbing) can be very different even for a same user. For a same user in a same movement gesture (e.g., walking), the motion data for various places where mobile device 100 is attached can be different as well. Thus, a plurality of trajectory models need to be generated to account for a variety of circumstances. It is contemplated that, a variety of algorithms can be used to determine the motion status based on the motion data.

Figure 3:
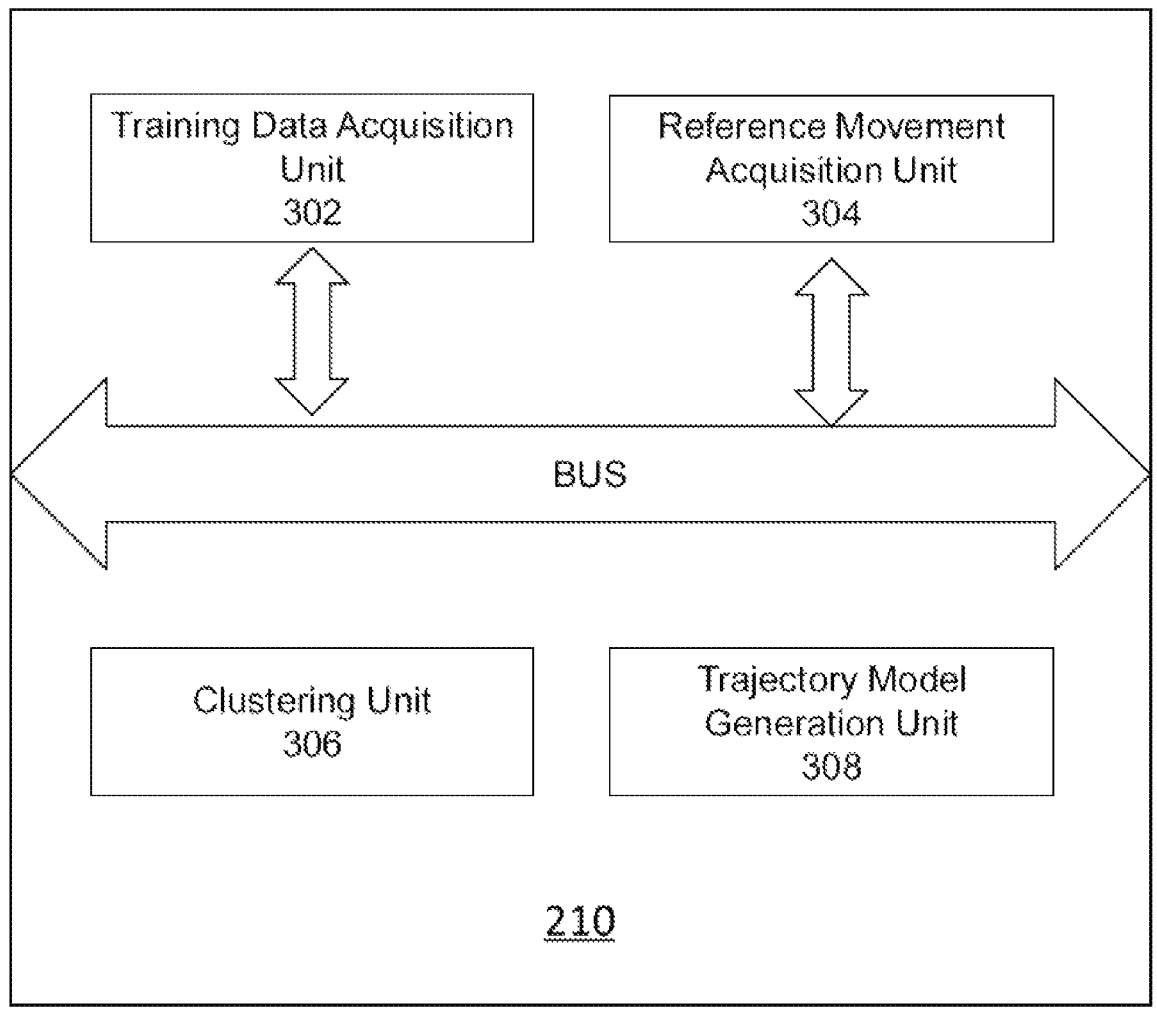
FIG. 3 illustrates a schematic diagram of an exemplary trajectory model training unit, according to embodiments of the disclosure.

Trajectory model training unit 208 can train the trajectory model based on training data. FIG. 3 illustrates a schematic diagram of an exemplary trajectory model training unit 208, according to embodiments of the disclosure. In some embodiments, as shown in FIG. 3, trajectory model training unit 208 can further include a training data acquisition unit 302, a reference movement acquisition unit 304, a clustering unit 306, and a trajectory model generation unit 308. Each of the component 302-308 can be connected to a bus for internal and external communications.

Training data acquisition unit 302 can acquire the training data associated with the subject in a plurality of time periods. The training data can be collected similarly as the motion data, and can similarly include the acceleration, the direction, the orientation, the barometric pressure, or the like. Because it is less likely that the movement pattern of the subject can change dramatically within a short time period, the motion data of the subject within the short time period are typically used for training the trajectory model. In some embodiments, the time period can be set as any suitable number, such as, for example, 500 milliseconds.

Reference movement acquisition unit 304 can acquire reference movements associated with the subject in the respective time periods. The reference movements can include vectors, e.g., indicating displacements and their corresponding directions that the subject has moved within the respective time periods. Each of the reference movements is associated with the motion data of the subject in the corresponding time period. In some embodiments, the reference movements can be acquired according to GPS signals received by reference movement acquisition unit 304. Reference movement acquisition unit 304 can precisely determine the reference movements of the subject based on the GPS signals. It is contemplated that, other methods or algorithms can be adopted to determine the reference movements.

Clustering unit 306 can cluster the training data and the reference movements into groups. For example, the training data and the reference movements can be clustered by using machine learning techniques. As discussed above, motion data acquired of different motion statuses can have different features. Motion data of different motion statuses may be acquired from a particular subject. In some embodiments, it is possible that places where mobile device 100 is attached can be changed during a movement gesture. For example, a user can walk on a street with his/her mobile device 100 placed in a pocket during a first time period, and clustering unit 306 can cluster the training data and the reference movement of the first time period into a group called "pocket/walking". Then, in a second time period, the user may receive a phone call and mobile device 100 may be held in hands while he/she continues to walk. Clustering unit 306 can then cluster the training data and the reference movement of the second time period into a group called "hands/walking", for instance. That is, even for training data generated during continuous time periods, the training data and the reference movements may be associated with different motion statuses. According, the data can be clustered into different groups corresponding to the respective motion statuses.

Trajectory model generation unit 308 can generate trajectory models based on the training data and the reference movements of the respective groups. Based on the training data and the reference movements of the respective groups, the trajectory models corresponding to the motion statuses can be generated using machine learning techniques. The generated trajectory models can be stored in memory 212 for further processing.

With reference back to FIG. 2, trajectory generation unit 210 can determine the trajectory based on the motion data using a trajectory model corresponding to the motion status. As discussed above, the trajectory models corresponding to the motion statuses may be trained using training data. Therefore, based on the current motion data, a current motion status can be determined. Accordingly, a trajectory model corresponding to the current motion status can be identified, and applied to determine the trajectory. In some embodiments, trajectory generation unit 210 may also directly identify the trajectory model based on the motion data using machine learning techniques, without having to first determine the current motion status.

Memory 212 may be configured to store the trajectory models and generated trajectories. Memory 212 may be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Therefore, trajectory generation system 200 according to embodiments of the disclosure can identify trajectory models corresponding to motion statuses, and determine trajectories based on motion data using the corresponding trajectory models. Furthermore, the trajectory models may be further associated with the respective users. Thus, trajectory generation system 200 can generate more precise trajectories.

Figure 4:
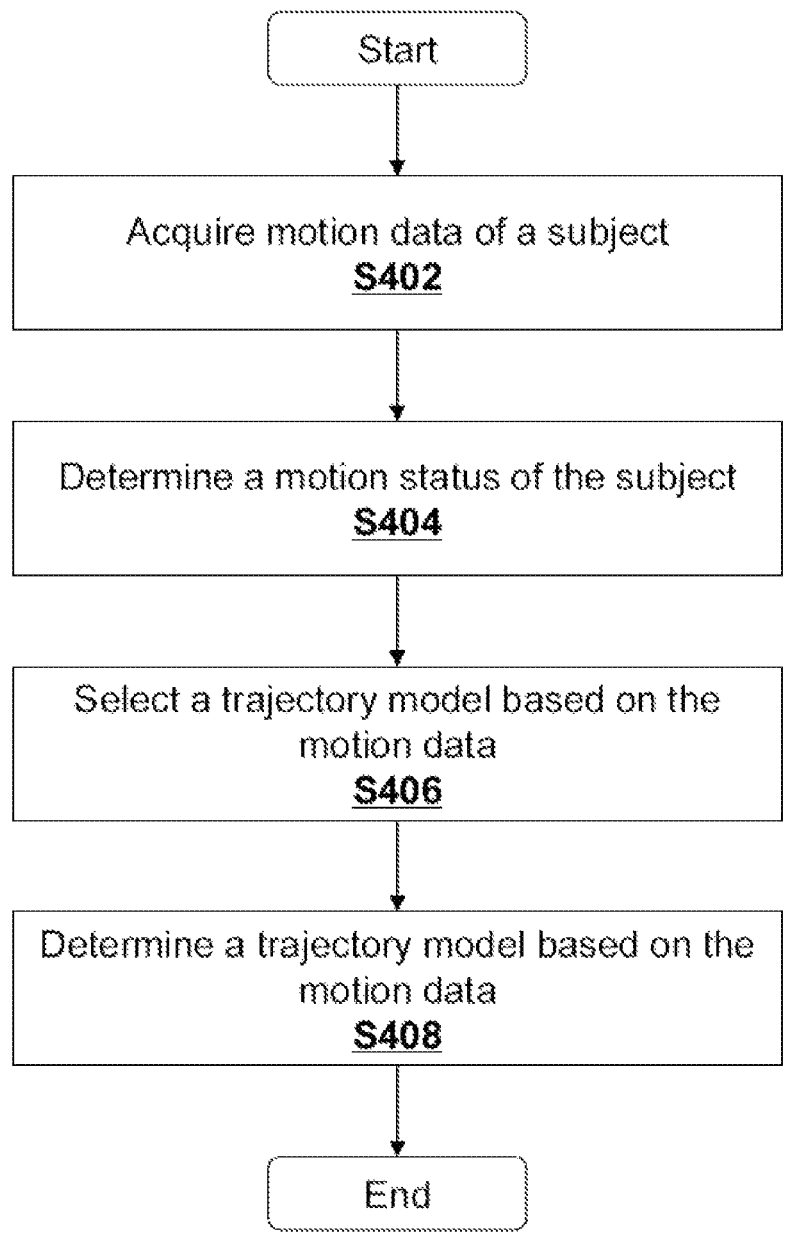
FIG. 4 is a flowchart of an exemplary method for generating a trajectory of a subject, according to some embodiments of the disclosure.

Another aspect of the disclosure provides a method for positioning a gateway of an architecture. For example, FIG. 4 is a flowchart of an exemplary method 400 for generating a trajectory of a subject, according to some embodiments of the disclosure. For example, method 400 may be implemented by trajectory generation system 200 including at least one processor, and method 400 may include steps S402-S408 as described below.

In step S402, trajectory generation system 200 can acquire motion data of the subject to which a mobile device is attached. The mobile device can include at least one sensor for collecting the motion data. The at least one sensor can include at least one of an accelerometer, a gyroscope, an electronic compass, or a barometer embedded within the mobile device. Therefore, the motion data can include the acceleration, the direction, the orientation, the barometric pressure, or the like. The motion data collected by the mobile device can be transmitted to trajectory generation system 200 for further processing.

In step S404, trajectory generation system 200 can determine a motion status of the subject based on the motion data. The motion status can include a movement gesture of the subject or a place on the subject where the mobile device is attached. The movement gesture can at least include walking, jogging, climbing, or the like. The place on the subject where the mobile device is attached can include the head, the wrist, the arm, the handbag, the pocket, or the like. Each motion status may have an unique pattern of motion data.

In some embodiments, trajectory generation system 200 can determine features such as a stride length, a stride frequency, and a direction of movement based on the motion data, and determine the motion status based on at least one of these features. The motion status may be characterized by a movement gesture of the subject and/or a place on the subject where the mobile device is attached. For example, the stride frequency for walking can be less than 120 strides per minute. When the determined stride frequency is less than 120 strides per minute, trajectory generation system 200 may determine the subject is walking. For a higher stride frequency, the subject be determined as be jogging. In some embodiments, the stride length, the stride frequency, and the direction of the movement may change if the place on the subject where the mobile device is attached is different. Therefore, trajectory generation system 200 can determine the motion status using the motion data. For example, the determined motion status can be "pocket/walking", indicating the mobile device is place in the pocket and the subject (e.g., a user) is walking when the corresponding motion data is generated.

In step S406, trajectory generation system 200 can identify a trajectory model based on the motion data. The trajectory model can be used to generate a trajectory based on the motion data. Trajectory generation system 200 may store a plurality of trajectory models corresponding to various motion statuses. In some embodiments, these trajectory models may be pre-trained using a processing device with higher computation power. Therefore, after the motion status is determined, trajectory generation system 200 can identify the trajectory model corresponding to the motion status. It is contemplated that, in some embodiments, when machine learning techniques are used to process the motion data acquired in step S402, the motion data can be clustered into at least one group. Each group can correspond to a trajectory model associated with a motion status. Therefore, trajectory generation system 200 can determine both the trajectory model and the motion status based on the motion data at the same time. In some embodiments, steps listed in FIG. 4 can be executed sequentially or in parallel, without being limited by the order of FIG. 4.

In step S408, trajectory generation system 200 can determine a trajectory based on the motion data using the trajectory model corresponding to the motion status. Provided with the motion data and the corresponding trajectory model, trajectory generation system 200 can determine the trajectory accordingly. In some embodiments, the trajectory may be determined directly based on the motion data. For example, the corresponding trajectory model can receive the motion data and generate the trajectory. In some other embodiments, the trajectory model can receive features such as the stride length, the stride frequency, and the direction of the movement generated in step S404, and generate the trajectory based on at least one of the above features (e.g., the stride length, the stride frequency, and the direction) using a trajectory model corresponding to the motion status.

Figure 5:
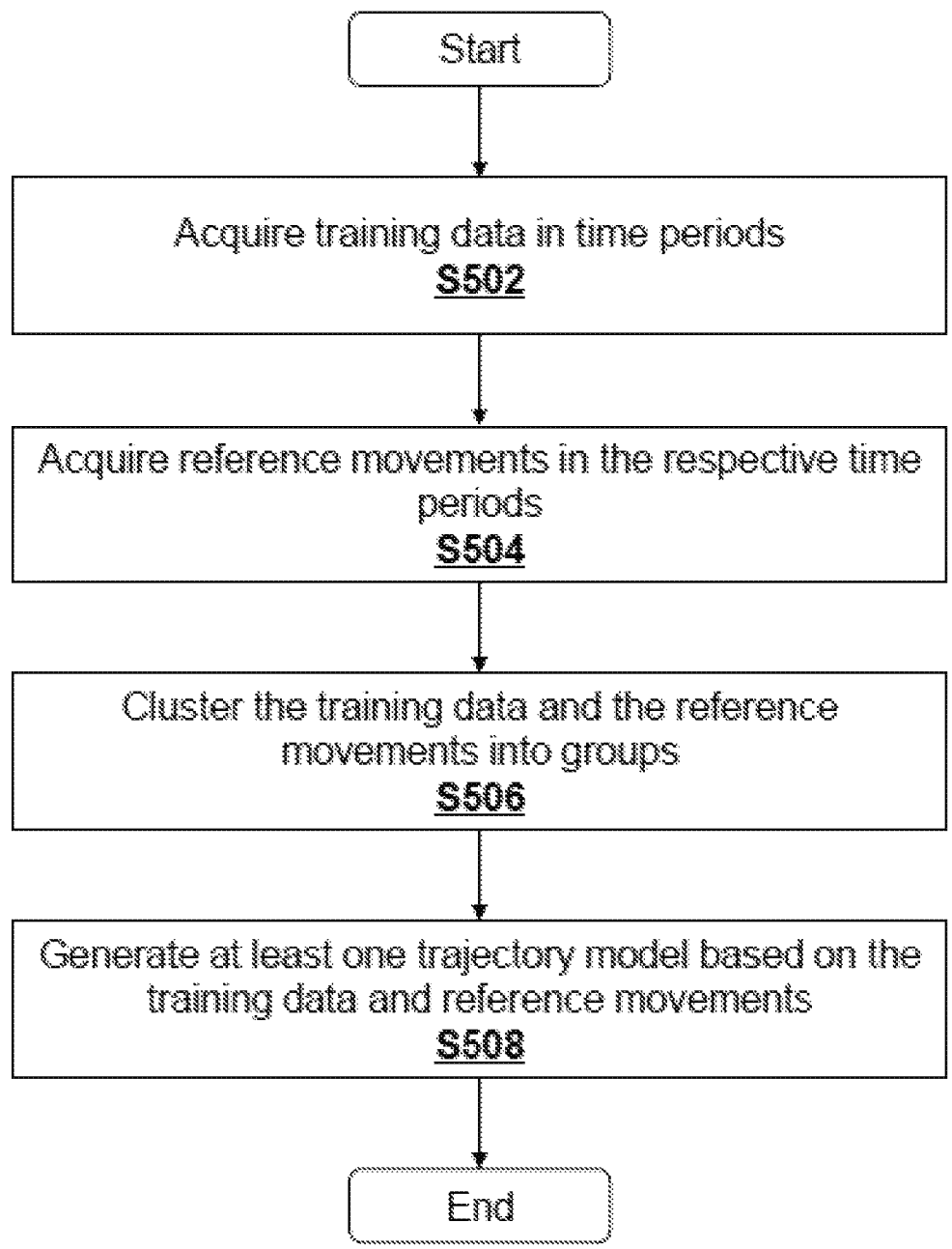
FIG. 5 is a flowchart of an exemplary method for training the trajectory model based on training data, according to some embodiments of the disclosure.

As discussed above, trajectory generation system 200 may store a plurality of trajectory models, and the trajectory models can be trained by trajectory generation system 200. FIG. 5 is a flowchart of an exemplary method 500 of training the trajectory model based on training data, according to some embodiments of the disclosure. For example, method 500 may be also implemented by trajectory generation system 200, and method 500 may include steps S502-S508 as below. Method 500 may be performed independently from method 400 (e.g., pre-trained) or as part of method 400 (e.g.; training on the fly).

In step S502, trajectory generation system 200 can acquire training data associated with the subject in a plurality of time periods. The training data can include Pedestrian Dead Reckoning (PDR) data. The training data is similar to the motion data described above, and the description of which will be omitted herein for clarity. Because movement pattern of the subject normally does not change dramatically within a short time period, motion data of the subject within the short time period can be used for training a trajectory model. In some embodiments, the time period can be set as, for example, 500 milliseconds.

In step S504, trajectory generation system 200 can acquire reference movements associated with the subject in the respective time periods. The reference movements are associated with the movement of the subject, and can be determined based on GPS signals. In some embodiments, trajectory generation system 200 can acquire the GPS signals received by the mobile device and then determine the reference movements. In some other embodiments, the reference movements can be determined by mobile device 100, and then acquired by trajectory generation system 200.

In step S504, trajectory generation system 200 can cluster the training data and the reference movements into groups. Because both of the training data and the reference movement can be associated with the movement of the subject within a time period, the training data and the corresponding reference movement can be clustered using machine learning techniques. Therefore, even if the motion status of the subject changes, the generated motion data and reference movements can still be clustered into corresponding groups. That is, each group is associated with a different motion status.

In step S506, trajectory generation system 200 can generate the trajectory model based on the training data and the reference movements of the respective groups. Based on the clustered motion data and reference movements, trajectory generation system 200 can train the trajectory model using machine learning techniques.

Method 500 can be applied to generate a plurality of trajectory models, and method 400 may apply these trained trajectory models for determine a trajectory of a subject based on motion data thereof. Because the trajectory models are associated with different motion statuses, even if the subject changes his/her motion status, method 400 can still determine an accurate trajectory.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed positioning system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A computer-implemented method for determining a trajectory of a subject, comprising:
   acquiring, via at least one sensor of a mobile device, motion data of the subject to which the mobile device is attached;
   determining, by a processor, a motion status of the subject based on the motion data;
   selecting, by the processor, a trajectory model corresponding to the determined motion status from a plurality of trajectory models respectively corresponding to a plurality of motion statuses; and
   determining, by the processor, the trajectory based on the motion data using the selected trajectory model corresponding to the determined motion status, wherein the plurality of trajectory models are generated by:
  acquiring training data associated with the subject in a plurality of time periods;
  acquiring reference movements associated with the subject in respective time periods;
  clustering the training data and the reference movements into groups; and
  generating the plurality of trajectory models based on the training data and the reference movements of respective groups.

2. The computer-implemented method of claim 1, wherein the determining a motion status of the subject based on the motion data further comprises:
  determining at least one of a stride length, a stride frequency, and a direction of movement based on the motion data; and determining the motion status based on at least one of the stride length, the stride frequency, and the direction of movement, wherein the motion status comprises a movement gesture of the subject or a place on the subject where the mobile device is attached.

3. The computer-implemented method of claim 2, wherein the determining the trajectory based on the motion data using the selected trajectory model corresponding to the determined motion status further comprises: generating the trajectory based on the at least one of the stride length, the stride frequency, and the direction of movement using the selected trajectory model corresponding to the determined motion status.

4. The method of claim 2, wherein the movement gesture comprises at least one of walking, jogging, or climbing.

5. The computer-implemented method of claim 1, wherein the generating the plurality of trajectory models based on the training data and the reference movements of the respective groups further comprises: generating the plurality of trajectory models using machine learning techniques.

6. The computer-implemented method of claim 1, wherein each group is associated with a different motion status.

7. The computer-implemented method of claim 1, wherein the at least one sensor includes at least one of an accelerometer, a gyroscope, an electronic compass, or a barometer of the mobile device.

8. The computer-implemented method of claim 1, wherein the training data comprises Pedestrian Dead Reckoning (PDR) data.

9. A system for generating a trajectory of a subject, comprising:
  a communication interface configured to communicate with a mobile device attached to the subject, acquiring motion data of the subject;
  a memory configured to store a plurality of trajectory models respectively corresponding to a plurality of motion statuses; and
  at least one processor configured to:
  determine a motion status of the subject based on the motion data,
  select a trajectory model corresponding to the determined motion status from the plurality of trajectory models stored in the memory, and
  determine the trajectory based on the motion data using the selected trajectory model corresponding to the determined motion status,
wherein the plurality of trajectory models are generated by:
  acquiring training data associated with the subject in a plurality of time periods;
  acquiring reference movements associated with the subject in respective time periods;
  clustering the training data and the reference movements into groups; and
  generating the plurality of trajectory models based on the training data and the reference movements of respective groups.

10. The system of claim 9, wherein the at least one processor is further configured to: determine at least one of a stride length, a stride frequency, and a direction of movement based on the motion data; and determine the motion status based on at least one of the stride length, the stride frequency, and the direction of movement, wherein the motion status comprises a movement gesture of the subject or a place on the subject where the mobile device is attached.

11. The system of claim 10, wherein the at least one processor is further configured to: generate the trajectory based on the at least one of the stride length, the stride frequency, and the direction of movement using the selected trajectory model corresponding to the determined motion status.

12. The system of claim 10, wherein the movement gesture comprises at least one of walking, jogging, or climbing.

13. The system of claim 9, wherein the processor is further configured to: generate the plurality of trajectory models using machine learning techniques.

14. The system of claim 9, wherein each group is associated with a different motion status.

15. The system of claim 9, wherein the at least one sensor includes at least one of an accelerometer, a gyroscope, an electronic compass, or a barometer of the mobile device.

16. A non-transitory computer-readable medium that stores a set of instructions, when executed by at least one processor of a device system, cause the device system to perform a method for generating a trajectory of a subject, the method comprising:
  acquiring motion data of the subject to which a mobile device is attached;
  determining a motion status of the subject based on the motion data;
  selecting, by the processor, a trajectory model corresponding to the determined motion status from a plurality of trajectory models respectively corresponding to a plurality of motion statuses; and
  determining the trajectory based on the motion data using the selected trajectory model corresponding to the determined motion status,
wherein the plurality of trajectory models are generated by:
  acquiring training data associated with the subject in a plurality of time periods;
  acquiring reference movements associated with the subject in respective time periods;
  clustering the training data and the reference movements into groups; and generating the plurality of trajectory models based on the training data and the reference movements of respective groups.

* * * * *